(No Model.)

O. A. ANTHONY.
STUMP PULLING MACHINE.

No. 287,606. Patented Oct. 30, 1883.

WITNESSES:
John R. Deemer
C. Sedgwick

INVENTOR:
O. A. Anthony
BY Munn & Co
ATTORNEYS.

N. PETERS. Photo-Lithographer. Washington, D. C.

UNITED STATES PATENT OFFICE.

ORREN A. ANTHONY, OF MAYFIELD, NEW YORK.

STUMP-PULLING MACHINE.

SPECIFICATION forming part of Letters Patent No. 287,606, dated October 30, 1883.

Application filed April 6, 1883. (No model.)

*To all whom it may concern:*

Be it known that I, ORREN A. ANTHONY, of Mayfield, Fulton county, New York, have invented a new and Improved Stump-Pulling Machine, of which the following is a full, clear, and exact description.

Reference is to be had to the accompanying drawings, forming part of this specification, in which similar letters of reference indicate corresponding parts in both figures.

Figure 1:
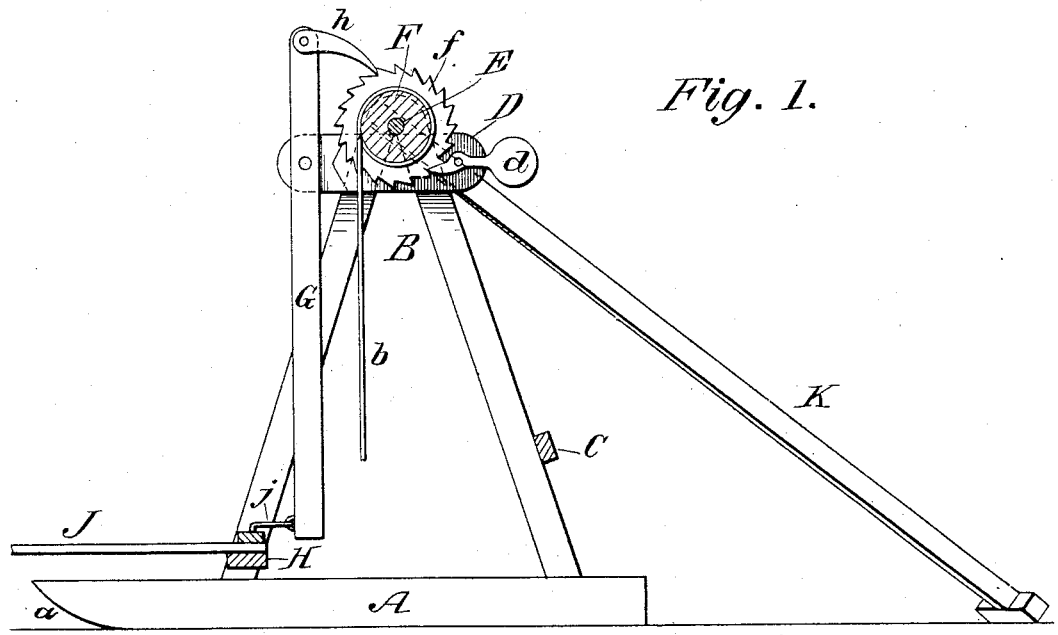
Figure 2:
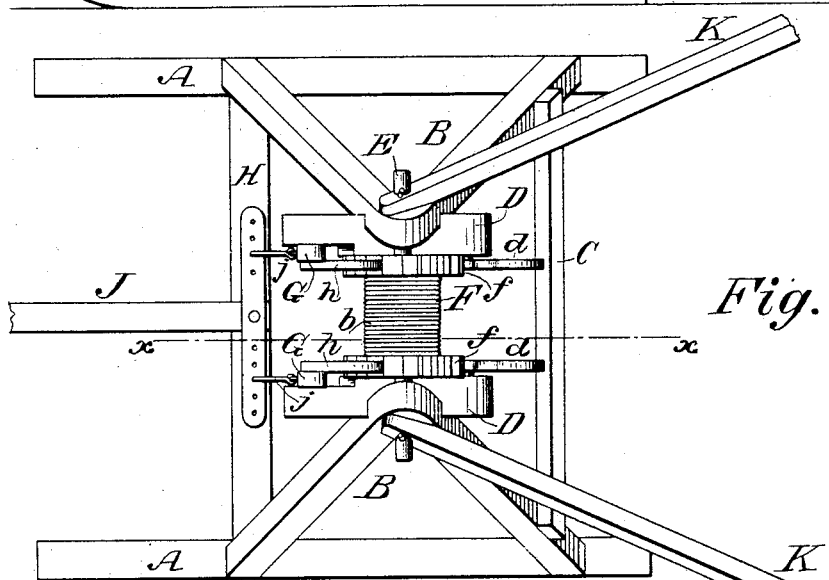

Figure 1 is a sectional elevation of my new and improved stump-pulling machine taken on the line $xx$ of Fig. 2, and Fig. 2 is a plan view of the machine.

The invention will first be described in connection with the drawings and then pointed out in the claims.

Referring to the drawings, A A represent the supporting-timbers of the frame of the machine, which are rounded at one end, as shown at $a$, to facilitate the hauling of the machine to and from the field and from stump to stump. Rising from the timbers A A are the V-uprights B B, that are inclined toward each other in the center of the frame, and are tied together by the bar C, and to the upper ends of these uprights are secured the blocks D D, upon which the shaft E takes its bearings. Upon the shaft E is placed the winding-drum F, upon which the chain $b$ is wound for pulling the stump. The drum F is formed or provided at its ends with the ratchets $ff$, for turning it, and the weighted pawls $d\,d$, pivoted to the blocks D D, engage with these ratchets for preventing backward movement of the drum while pulling the stump. The drum is turned for winding up the chain $b$, for pulling the stump, by means of the vertical levers G G, pivoted to the blocks D D, pawls $h\,h$, pivoted to the upper ends of said vertical levers, which pawls engage with the ratchets $ff$, and the horizontal T-lever J, pivoted upon the cross-bar H, and connected with the lower ends of the levers G G by the connecting-rods $jj$.

K K are T-headed braces, removably attached upon the ends of the shaft E, for staying the machine while the lever J is being reciprocated for pulling the stump.

In use the machine will be drawn six or eight feet past the stump to be pulled, with the braces K K resting upon the ground each side of the stump and far enough away from the stump to clear the roots thereof. The chain $b$ will then be hooked around the stump and the T-lever J reciprocated horizontally, which, through the connections $j\,j$, will reciprocate alternately the levers G G, causing the pawls $h\,h$ to alternately engage with the ratchets $ff$ and force the drum F forward, winding up the chain $b$, causing the stump to be tipped bottom side up. The drum F will be held from backward movement while pulling the stump by the pawls $d\,d$, as above mentioned, and as will be understood from Fig. 1.

Constructed in this manner it will be seen that the machine is adapted to tip the stump out of the ground sidewise, which is a great advantage in cleaning the stump, and it will be seen that the machine is comparatively cheap, easily handled, and is strong, durable, and practical for the purpose of clearing land of stumps and stones.

Having thus described my invention, I claim as new and desire to secure by Letters Patent—

1. In a stump-machine, the winding-drum F, having ratchets $f$, and supported in a suitable frame, in combination with the T-lever J, vertical levers G, and pawls $h$ and $d$, arranged to operate substantially as and for the purpose set forth.

2. In a stump-machine, the combination, with the uprights B B, of the detachable braces K K, substantially as and for the purposes set forth.

3. The stump-machine herein shown and described, consisting of the timbers A A and uprights B B, having blocks D D, in combination with the winding-drum F, having ratchets $f$, vertical levers G G, horizontal T-lever J, pawls $h\,d$, and braces K K, substantially as and for the purposes set forth.

ORREN A. ANTHONY.

Witnesses:
 D. GETMAN, Jr.,
 DAVID GETMAN.